(12) United States Patent
Ejiri (10) Patent No.: US 9,281,610 B2
(45) Date of Patent: Mar. 8, 2016

(54) TRAY TYPE CARD CONNECTOR HAVING A FRONT COVER WITH A SEALING MEMBER

(71) Applicant: SMK Corporation, Tokyo (JP)

(72) Inventor: Koichiro Ejiri, Tokyo (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 14/556,356

(22) Filed: Dec. 1, 2014

(65) Prior Publication Data

US 2015/0155651 A1 Jun. 4, 2015

(30) Foreign Application Priority Data

Dec. 3, 2013 (JP) ................................. 2013-249878

(51) Int. Cl.
*H01R 13/52* (2006.01)
*G06K 7/00* (2006.01)
*G06K 13/08* (2006.01)

(52) U.S. Cl.
CPC .......... *H01R 13/5213* (2013.01); *G06K 7/0021* (2013.01); *G06K 13/0831* (2013.01); *H01R 13/5219* (2013.01); *H01R 2201/06* (2013.01)

(58) Field of Classification Search
CPC ............................ H01R 13/52; H01R 13/5219
USPC .................. 439/271–275, 157–160, 587–589
See application file for complete search history.

(56) References Cited

FOREIGN PATENT DOCUMENTS

| JP | 08-335255 A | 12/1996 |
|----|-------------|---------|
| JP | 3170288 U | 8/2011 |
| JP | 2012-234669 A | 11/2012 |
| JP | 2013-051134 A | 3/2013 |
| JP | 2013-178887 A | 9/2013 |

*Primary Examiner* — Chandrika Prasad
(74) *Attorney, Agent, or Firm* — Locke Lord LLP (57) ABSTRACT

Provided is a tray type card connector that is compatible with waterproof electronic devices and that can easily perform the insertion and removal of a card into/from the electronic devices. A tray type card connector includes a card tray; a housing having a tray insertion portion; a plurality of contacts arranged in the housing so as to project within the tray insertion portion; a front cover portion fitting in a casing opening portion opened at a lateral surface portion of a casing of an electronic device A, at a front end portion of the card tray; a ring-shaped cover water-sealing member made of an elastic material at an outer periphery portion of the front cover portion.

7 Claims, 11 Drawing Sheets

TRAY TYPE CARD CONNECTOR HAVING A FRONT COVER WITH A SEALING MEMBER

CROSS-REFERENCE TO RELATED APPLICATION

This application claims priority of Japanese Patent Application No. 2013-249878 filed Dec. 3, 2013, which is incorporated herein by reference in its entirety.

BACKGROUND

1. Technical Field

The present invention relates to a card connector for connecting a card such as an IC card or a flash memory card into a mobile phone, a smartphone, or other electronic devices. More particularly, the present invention relates to a tray type card connector compatible with waterproof electronic devices.

2. Related Art

Conventionally, for an external storage medium for an electronic device such as a mobile phone or a smartphone, a card such as an IC card or a flash memory card is used. The card and a printed wiring board installed in the electronic device are electrically connected to each other through a card connector.

There is known a card connector that includes a housing disposed in an electronic device; a card tray that is inserted into the housing through a casing opening portion opened at a lateral surface portion of a casing of the electronic device; and a plurality of contacts arranged in the housing. By inserting the card tray into the housing through the casing opening portion, a front cover portion disposed at a front end portion of the card tray fits into the casing opening portion.

In such a tray type card connector, when the front cover portion of the card tray fits in the casing opening portion, the card tray cannot be easily ejected. Thus, the tray type card connector has a tray ejection mechanism that allows the card tray to be ejected from the housing and the electronic device by an operation performed externally of the casing of the electronic device.

For the tray ejection mechanism that can be operated externally of the casing of the electronic device, for example, a pin-eject tray ejection mechanism is known (see, for example, JP 2013-51134 A). The pin-eject tray ejection mechanism has an operation member disposed at a side portion of a housing so as to be pushable; and a turn lever that turns in conjunction with the push operation of the operation member. A pin insertion hole opened so as to be disposed continuously with the operation member is provided at a front cover portion of a card tray or a lateral surface portion of a casing. By inserting a pin member into the housing externally of the casing through the pin insertion hole, the operation member is pushed. By pushing one end of the turn lever by the operation member, the turn lever turns, and a back edge of the card tray is pushed out by the other end side of the turn lever in an ejection direction.

However, with diversification of the usage modes of electronic devices such as mobile phones and smartphones, there is a demand to waterproof the entire electronic device. Hence, a structure is required that prevents the entry of water into the electronic device through the casing opening portion.

In addition, in the case of a card connector having the conventional pin-eject tray ejection mechanism such as that described above, in order to operate the operation member or the turn lever externally of the casing of the electronic device, the pin insertion hole is provided in the front cover portion or the casing of the electronic device, and a pin is inserted into the electronic device through the pin insertion hole to push the operation member or the turn lever with the pin. Since the pin insertion hole passes through internally and externally of the casing of the electronic device, there is a problem that the card connector is not compatible with waterproof devices.

In view of such a conventional problem, an object of the present invention is therefore to provide a tray type card connector that is compatible with waterproof electronic devices and that can easily perform the insertion and removal of a card into/from the electronic devices.

SUMMARY

A first aspect of the present invention to solve the above-described conventional problem and achieve the intended object is directed to a tray type card connector including: a card tray that holds a card; a housing having a tray insertion portion into which the card tray is inserted; and a plurality of contacts arranged in the housing so as to project within the tray insertion portion, in which pad portions formed on the card held in the card tray come into contact with the contacts by inserting the card tray into the tray insertion portion, the tray type card connector including: a front cover portion at a front end portion of the card tray, the front cover portion fitting in a casing opening portion opened at a lateral surface portion of a casing of an electronic device; and a ring-shaped cover water-sealing member at an outer periphery portion of the front cover portion, the cover water-sealing member being made of an elastic material, wherein when the front cover portion fits in the casing opening portion, a gap between an inner surface of the casing opening portion and an outer surface of the front cover portion is sealed by the cover water-sealing member.

According to a second aspect of the present invention, in addition to the configuration of the first aspect, the tray type card connector further includes: an operation member disposed at a side portion of the housing so as to be movable in a tray insertion and removal direction; tray push-out means for pushing out the card tray in a removal direction in conjunction with push operation of the operation member; a pin insertion hole made in the front cover portion so as to be disposed continuously with the operation member; and a water-sealing pin movably held in the pin insertion hole, and the operation member performs push operation in conjunction with movement of the water-sealing pin, the tray type card connector further includes a ring-shaped pin water-sealing member at an outer periphery portion of the water-sealing pin, the pin water-sealing member being made of an elastic material, and a gap between an inner surface of the pin insertion hole and an outer surface of the water-sealing pin is sealed by the pin water-sealing member.

According to a third aspect of the present invention, in addition to the configuration of the second aspect, the water-sealing pin has a slip-out preventing portion that juts out outwardly to get engaged with a rear end opening edge portion of the pin insertion hole, and the water-sealing pin is held in the pin insertion hole so as to be movable and to be incapable of slipping out.

According to a fourth aspect of the present invention, in addition to the configuration of the second or third aspect, the water-sealing pin is integrally formed with the operation member.

According to a fifth aspect of the present invention, in addition to the configuration of the first aspect, the card tray has the front cover portion at a front end portion of a tray main body where the card is held, such that the front cover portion is movable relative to the tray main body, and has transmission means for transmitting a force in a tray pull-out direction to the tray main body, the force acting on the front cover portion being moved to a desired pull-out position relative to the tray main body, and the front cover portion is allowed to move relative to the tray main body to pull out the card tray using the front cover portion as a finger holding part.

According to a sixth aspect of the present invention, in addition to the configuration of the first aspect, the tray type card connector further includes: an ejector that moves with the card tray; a push-out spring that biases the ejector in a push-out direction; a heart cam disposed in one of the housing and the ejector; a loop-shaped pin guide groove provided around the heart cam; and a lock pin that has, at its one end, an engagement pin portion slidably inserted into the pin guide groove, and that is turnably supported, at its other end, by an other one of the housing and the ejector, and by initial card tray push operation, the engagement pin portion moves to a position where the engagement pin portion is engaged with the heart cam, by which movement in a tray push-out direction of the ejector is restricted, and by another card tray push operation, the engagement pin portion is disengaged from the heart cam, by which the engagement is released.

As described above, a card connector according to the present invention includes: a card tray that holds a card; a housing having a tray insertion portion into which the card tray is inserted; and a plurality of contacts arranged in the housing so as to project within the tray insertion portion. Pad portions formed on the card held in the card tray come into contact with the contacts by inserting the card tray into the tray insertion portion. The tray type card connector includes: a front cover portion at a front end portion of the card tray, the front cover portion fitting in a casing opening portion opened at a lateral surface portion of a casing of an electronic device; and a ring-shaped cover water-sealing member at an outer periphery portion of the front cover portion, the cover water-sealing member being made of an elastic material. When the front cover portion fits in the casing opening portion, a gap between an inner surface of the casing opening portion and an outer surface of the front cover portion is sealed by the cover water-sealing member. Accordingly, the card connector is compatible with waterproof electronic devices and can easily perform the insertion and removal of a card into/from the electronic devices.

In addition, in the present invention, the tray type card connector further includes: an operation member disposed at a side portion of the housing so as to be movable in a tray insertion and removal direction; tray push-out means for pushing out the card tray in a removal direction in conjunction with push operation of the operation member; a pin insertion hole made in the front cover portion so as to be disposed continuously with the operation member; and a water-sealing pin movably held in the pin insertion hole. The operation member performs push operation in conjunction with movement of the water-sealing pin. The tray type card connector further includes a ring-shaped pin water-sealing member at an outer periphery portion of the water-sealing pin, the pin water-sealing member being made of an elastic material, and a gap between an inner surface of the pin insertion hole and an outer surface of the water-sealing pin is sealed by the pin water-sealing member. Accordingly, even if the card connector is the so-called pin-eject card connector, the card connector is compatible with waterproof devices.

Furthermore, in the present invention, the water-sealing pin has a slip-out preventing portion that juts out outwardly to get engaged with a rear end opening edge portion of the pin insertion hole, and the water-sealing pin is held in the pin insertion hole so as to be movable and to be incapable of slipping out. Accordingly, the water-sealing pin can be suitably retained in the front cover portion.

Moreover, in the present invention, the water-sealing pin is integrally formed with the operation member. Accordingly, the number of components can be reduced.

In addition, in the present invention, the card tray has the front cover portion at a front end portion of a tray main body where the card is held, such that the front cover portion is movable relative to the tray main body, and has transmission means for transmitting a force in a tray pull-out direction to the tray main body, the force acting on the front cover portion being moved to a desired pull-out position relative to the tray main body. The front cover portion is allowed to move relative to the tray main body to pull out the card tray using the front cover portion as a finger holding part. Accordingly, in a state in which the card tray is inserted into an electronic device, the casing opening portion can be suitably made watertight by the front cover portion and the cover water-sealing member. When the card tray is pulled out, only resistance by the cover water-sealing member acts on the front cover portion. Thus, the front cover portion can be pulled out relative to the tray main body with a small force. After pulling out, a force of a certain magnitude or more can be allowed to act on the entire card tray using the front cover portion as a finger holding part. Accordingly, the card tray can be easily pulled out of the housing and the electronic device.

In addition, in the present invention, the tray type card connector further includes: an ejector that moves with the card tray; a push-out spring that biases the ejector in a push-out direction; a heart cam disposed in one of the housing and the ejector; a loop-shaped pin guide groove provided around the heart cam; and a lock pin that has, at its one end, an engagement pin portion slidably inserted into the pin guide groove, and that is turnably supported, at its other end, by an other one of the housing and the ejector. By initial card tray push operation, the engagement pin portion moves to a position where the engagement pin portion is engaged with the heart cam, by which movement in a tray push-out direction of the ejector is restricted. By another card tray push operation, the engagement pin portion is disengaged from the heart cam, by which the engagement is released. Accordingly, in a state in which the card tray is inserted into an electronic device, the casing opening portion can be suitably made watertight by the front cover portion and the cover water-sealing member. When the card tray is pulled out, only by push operation of the card tray, the card tray can be easily pulled out.

DETAILED DESCRIPTION

Next, a first embodiment of a tray type card connector 1 according to the present invention will be described based on an implementation example shown in FIGS. 1 to 6.

Note that in the drawings reference sign A indicates an electronic device such as a mobile phone or a smartphone, and reference sign B indicates a card such as an IC card. Note also that in the present implementation example a description is made with the front side in a card tray insertion and removal direction being "front" and the back side being "rear".

The electronic device A is structured such that the tray type card connector 1 is used for connection of the card B such as an IC card, and by inserting and removing a card tray 2 into/from the electronic device A through a casing opening portion Aa opened at a lateral surface portion of a casing of the electronic device A, the card B can be mounted and demounted on/from a housing 3 disposed in the electronic device A, and the casing opening portion Aa can be closed by a front cover portion 4 provided at a front end portion of the card tray 2.

The card B is, for example, a rectangular IC card, and has a plurality of signal transmission pad portions b1, b1 . . . on one side thereof.

Figure 1:
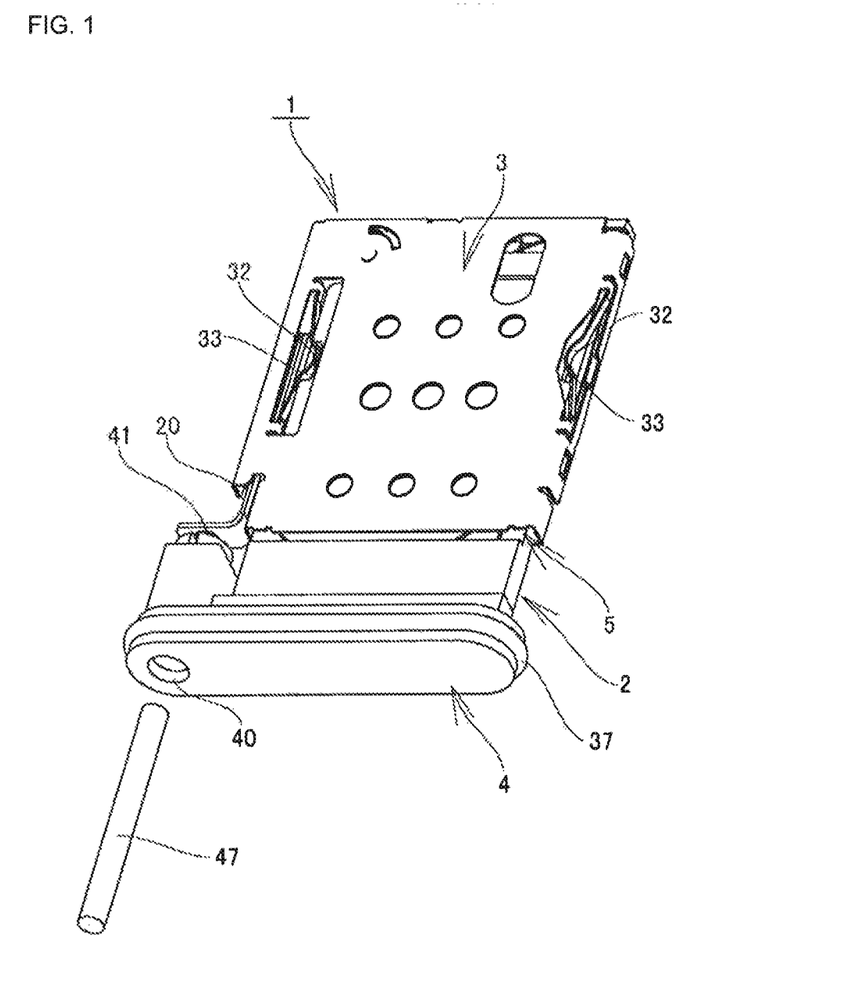
FIG. 1 is a perspective view showing an example of a tray type card connector according to the present invention.
Figure 2:
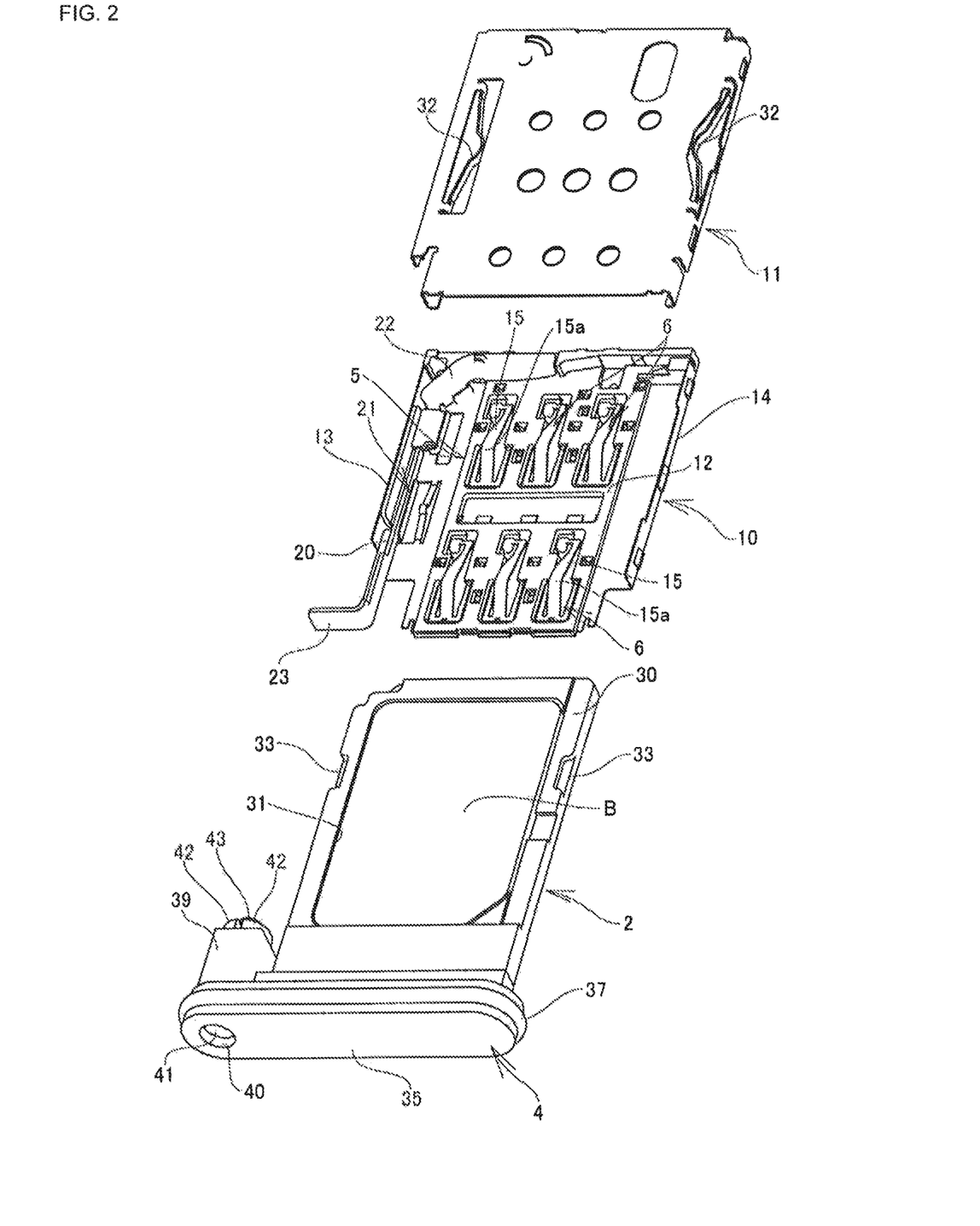
FIG. 2 is an exploded perspective view of the tray type card connector.

As shown in FIGS. 1 and 2, the card connector 1 includes the card tray 2 where the card B is held; the housing 3 having a tray insertion portion 5 into which the card tray 2 is inserted; and a plurality of contacts 6, 6 . . . arranged in the housing 3 so as to project within the tray insertion portion 5. By inserting the card tray 2 into the housing 3 through the casing opening portion Aa, the pad portions b1, b1 . . . of the card B held in the card tray 2 come into contact with the corresponding contacts 6, 6 . . . , by which the card B is electrically connected to a substrate having the card connector 1 mounted thereon.

In addition, the card connector 1 has an ejection mechanism for ejecting the card tray 2 from the housing 3. By the ejection mechanism, the card tray 2 can be ejected from the housing 3 and the casing of the electronic device A.

As shown in FIG. 2, the housing 3 is formed in a hollow box form where the tray insertion portion 5 is opened at the front, by assembling a housing main body 10 having a base plate portion 12 made of an insulating synthetic resin and a shield cover 11 made of a conductive metal. The card tray 2 is inserted and removed through the opening at the front.

The housing main body 10 has the flat-shaped base plate portion 12 and sidewall portions 13 and 14 rising from two side edge portions of the base plate portion 12. By the base plate portion 12 and both of the sidewall portions 13 and 14, the tray insertion portion 5 whose top side is recessed is formed. A top surface of the tray insertion portion 5 is covered by a top of the shield cover 11, thereby forming a hollow box form with opening at the front.

The plurality of contacts 6, 6 . . . formed by punching and bending a conductive metal plate material are incorporated into the base plate portion 12 of the housing main body 10 by insert molding. Elastic contact piece portions 15, 15 . . . of the contacts 6, 6 . . . project within the tray insertion portion 5, and contact points 15a at the tips of the elastic contact piece portions 15 come into contact with the corresponding pad portions b1 of the card B.

In addition, the housing main body 10 has, on the inner side of the sidewall portion 13, an operation member retaining portion 21 that retains a rod-like operation member 20 so as to be slidable and movable in the tray insertion and removal direction. The operation member 20 is provided to the operation member retaining portion 21 so as to be pushable in the tray insertion and removal direction.

In the housing 3, a tray ejection mechanism is formed by the operation member 20 which is pushable in the tray insertion and removal direction, and tray push-out means for pushing out the card tray 2 in a removal direction in conjunction with the push operation of the operation member 20.

The tray push-out means has a turn lever 22 turnably disposed at the rear on the operation member 20's side of the housing main body 10. By allowing the operation member 20 to operate in a push direction, one end 22a of the turn lever 22 is pushed by the tip of the operation member 20, by which the turn lever 22 turns. Along with the turn, an other end 22b of the turn lever 22 pushes out a rear edge of the card tray 2 in the removal direction.

The operation member 20 is formed in an elongated rod shape and has, at its front end portion, an outwardly-bent, to-be-pressed portion 23 integrally formed therewith, forming a top view inverted L-shape.

Figure 3A:
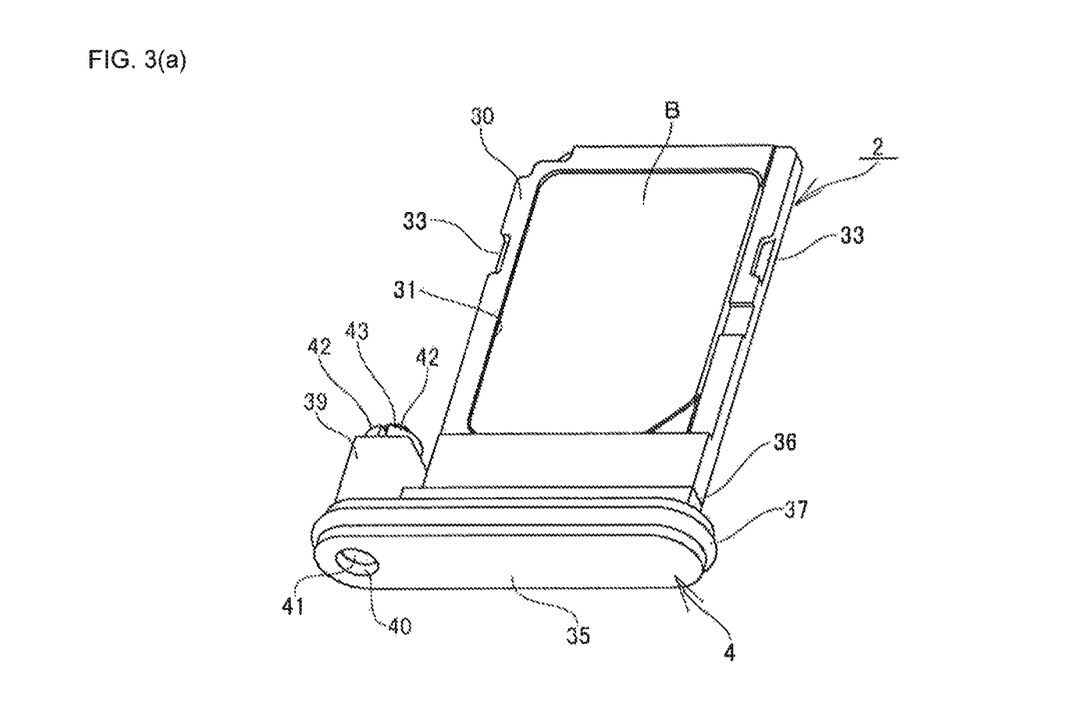
FIGS. 3A and 3B are perspective views showing a card tray in FIG. 2.
Figure 3B:
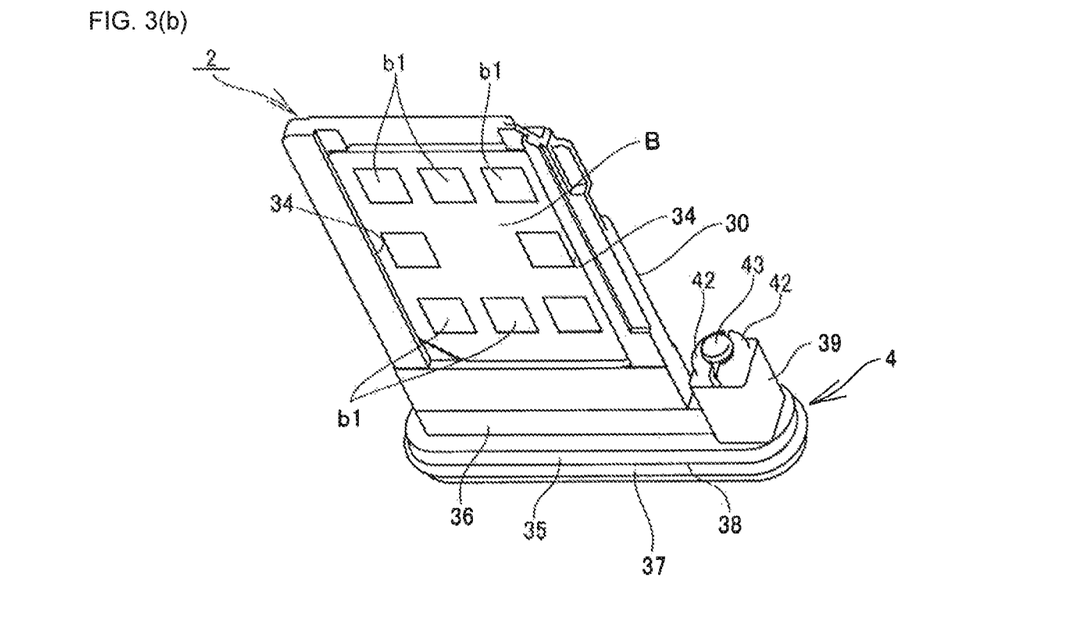

As shown in FIGS. 3A and 3B, the card tray 2 has a tray main body 30 where the card B is held; and the front cover portion 4 fixed at a front end portion of the tray main body 30 in a flanged manner.

The tray main body 30 is formed in a flat shape using an insulating synthetic resin material. The tray main body 30 has a card holding portion 31 having a rectangular hole which passes through in a plate thickness direction, and in which the card B fits from one side.

In addition, engagement recess portions 33 and 33 that are engaged with spring-like engagement members 32 provided to the housing 3 are formed at two side portions of the tray main body 30. By the engagement recess portions 33 and 33 getting engaged with the engagement members 32, the card tray 2 is placed in the so-called half-locked state on the housing 3.

The card holding portion 31 is formed in a rectangular hole shape that matches the shape of the card B. The card holding portion 31 has, at its bottom inner edge portions, card supporting portions 34 and 34 which inwardly jut out. By the card supporting portions 34 and 34 supporting two side edge portions of the card B, the card holding portion 31 can hold the card B with the signal transmission pad portions b1, b1 . . . exposed at the bottom.

The front cover portion 4 has a cover main body 35 that fits in the casing opening portion Aa; and a coupling portion 36 integrally provided in a protruding manner with a rear surface of the cover main body 35. By coupling the coupling portion 36 to a front end portion of the tray main body 30, the front cover portion 4 is fixed to the front end portion of the card tray 2 in a flanged manner, by which the tray main body 30 and the front cover portion 4 are integrated. In addition, the front cover portion 4 has a ring-shaped cover water-sealing member 37 made of an elastic material such as rubber, at an outer periphery portion of the cover main body 35.

The cover main body 35 is formed to match the shape of the casing opening portion Aa. The cover main body 35 has a front view rounded corner rectangular shape and forms a rounded corner rectangular parallelepiped shape having a certain thickness in the tray insertion and removal direction. A groove portion 38 for water-sealing member fixation in a circumferential direction is formed at the outer periphery portion of the cover main body 35. The cover water-sealing member 37 fits in the groove portion 38.

Figure 4:
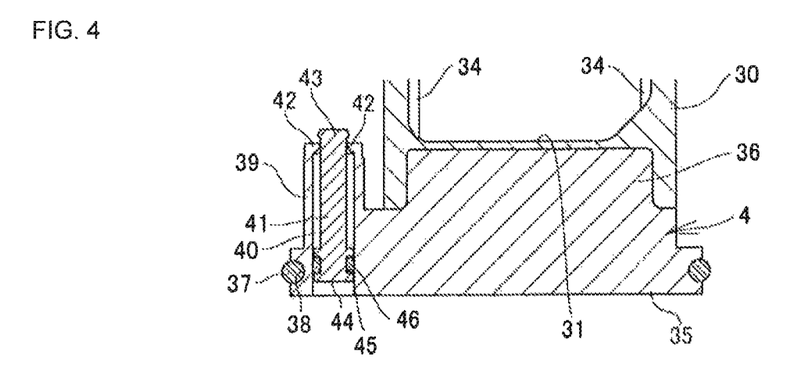
FIG. 4 is a partially enlarged transverse cross-sectional view showing a front cover portion of the card tray.

As shown in FIG. 4, the cover water-sealing member 37 is formed such that its cross section in the circumferential direction is larger than the depth of the groove portion 38. The cover water-sealing member 37 fits in the groove portion 38 so as to project outwardly all around from an outer periphery surface of the cover main body 35. When the cover main body 35 fits in the casing opening portion Aa, the cover water-sealing member 37 is sandwiched between an inner surface of the casing opening portion Aa and the outer periphery surface of the cover main body 35, by which a gap between the inner surface of the casing opening portion Aa and the outer periphery surface of the cover main body 35 is sealed.

In addition, the cover main body 35 has, at its rear surface of one side portion thereof, a projecting projection portion 39 integrally provided therewith. A pin insertion hole 40 in the tray insertion and removal direction which is opened at the front of the cover main body 35 is made so as to be disposed continuously with the position of the operation member 20. A water-sealing pin 41 is held in the pin insertion hole 40 so as to be movable in the tray insertion and removal direction.

The pin insertion hole 40 has, at its rear end opening edge portion, a pair of halved circular retaining and sandwiching portions 42 and 42 jutting out inwardly. A slip-out preventing portion 43 of the water-sealing pin 41 which will be described later is engaged with rear end edge portions of both of the retaining and sandwiching portions 42 and 42.

The water-sealing pin 41 is formed in a round bar shape and has, at its front end portion, a piston-like slide sealing portion 44 which movably fits in the pin insertion hole 40. A groove portion 45 for water-sealing member fixation in a circumferential direction is formed at an outer periphery portion of the slide sealing portion 44. A ring-shaped pin water-sealing member 46 made of an elastic material such as rubber fits in the groove portion 45.

The pin water-sealing member 46 is formed such that its cross section in the circumferential direction is larger than the depth of the groove portion 45 for water-sealing member fixation. The pin water-sealing member 46 fits in the groove portion 45 so as to project outwardly all around from an outer periphery surface of the slide sealing portion 44. The pin water-sealing member 46 is sandwiched between an inner surface of the pin insertion hole 40 and the outer periphery surface of the slide sealing portion 44, by which a gap between the inner surface of the pin insertion hole 40 and the outer periphery surface of the water-sealing pin 41 is sealed.

In addition, the water-sealing pin 41 has, at its rear end portion, the slip-out preventing portion 43 jutting out outwardly. By the slip-out preventing portion 43 getting engaged with the rear end opening edge portion of the pin insertion hole 40, i.e., both of the retaining and sandwiching portions 42 and 42, the water-sealing pin 41 is prevented from slipping out of a front end opening of the pin insertion hole 40.

Note that the above-described retaining and sandwiching portions 42 and 42 are formed so as to be elastically deformable. By the slip-out preventing portion 43 pushing and opening the retaining and sandwiching portions 42 and 42, the water-sealing pin 41 can be held in the pin insertion hole 40, with its rear end portion projecting from a rear end of the projection portion 39.

Figure 5:
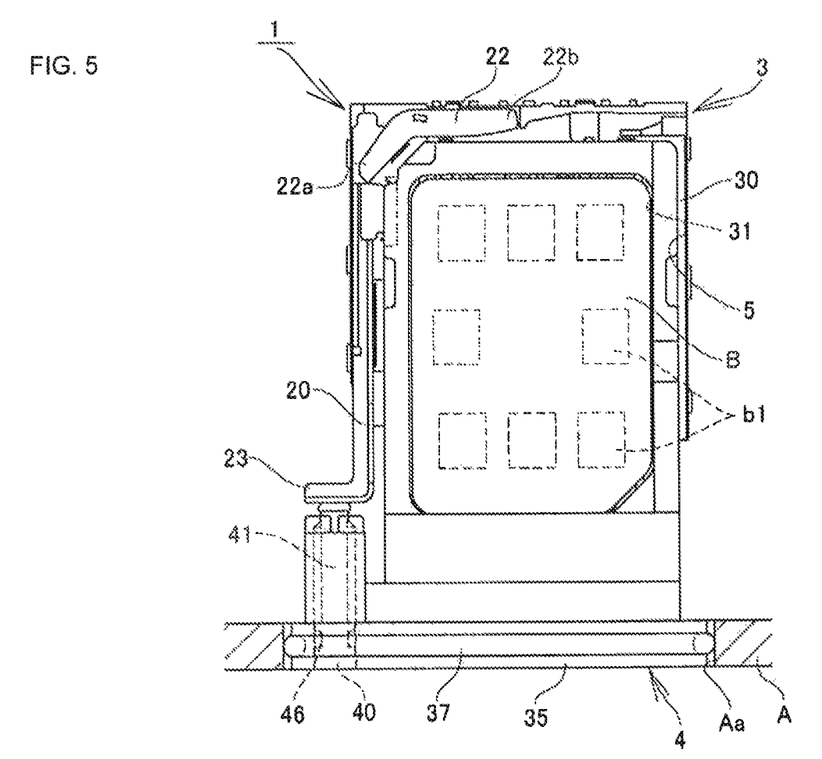
FIG. 5 is a partially cutaway transverse cross-sectional view showing a state in which the tray type card connector in FIG. 1 is incorporated into an electronic device.

In the tray type card connector 1 configured in the above-described manner, when, as shown in FIG. 5, the card tray 2 is inserted into the electronic device A through the casing opening portion Aa, the tray main body 30 is inserted into the tray insertion portion 5 of the housing 3 disposed in the electronic device A, and the front cover portion 4 fits in the casing opening portion Aa.

At that time, with the insertion of the card tray 2, the one end 22b of the turn lever 22 is pushed rearwardly of the card tray 2 and turns. In conjunction with the turn, the operation member 20 moves frontward and becomes pushable, and the water-sealing pin 41 becomes pushable frontward of the pin insertion hole 40 and its rear end abuts on the to-be-pressed portion 23 of the operation member 20.

In this state, the gap between the inner surface of the casing opening portion Aa and the outer periphery surface of the front cover portion 4 is made watertight by the cover water-sealing member 37, and the gap between the inner periphery surface of the pin insertion hole 40 and the outer periphery surface of the water-sealing pin 41 is made watertight by the pin water-sealing member 46. Thus, the entry of water into the electronic device A through the casing opening portion Aa is prevented.

Figure 6:
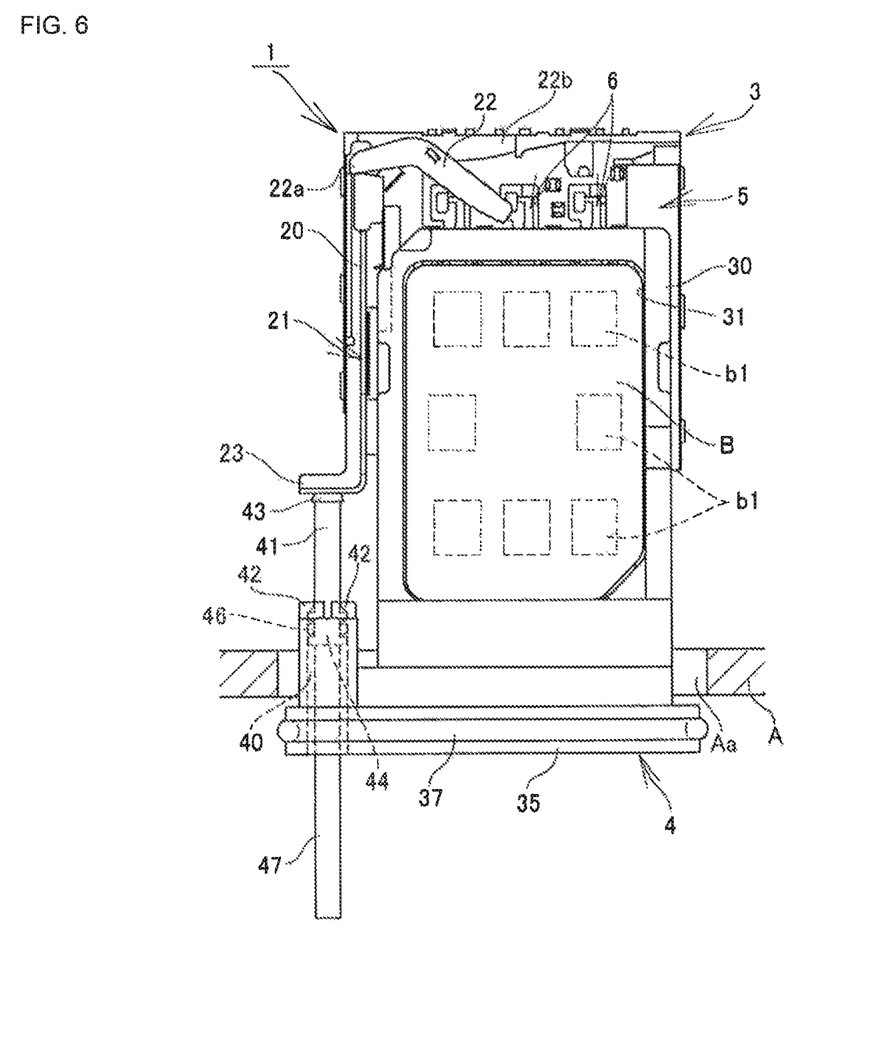
FIG. 6 is a partially cutaway transverse cross-sectional view showing a state of the tray type card connector when card tray ejection operation is performed.

On the other hand, to pull out the card tray 2 in the state of FIG. 5, a rod-like pin member 47 is inserted into the pin insertion hole 40 through the front end opening to press the front end of the water-sealing pin 41 in the push direction. By this, as shown in FIG. 6, the water-sealing pin 41 moves within the pin insertion hole 40, and the rear end side of the water-sealing pin 41 projects from the rear end of the projection portion 39, pushing the operation member 20 rearward.

By that, the turn lever 22 turns in conjunction with the push operation of the operation member 20, and an end portion of the turn lever 22 presses a rear end edge of the card tray 2, pushing out the card tray 2 in the removal direction.

Note that although in the above-described implementation example an example is described in which the operation member 20 and the water-sealing pin 41 are provided separately, the water-sealing pin 41 may be integrally provided at the front end of the operation member 20. In that case, the operation member 20 moves in the insertion and removal direction in conjunction with both of the insertion and removal of the card tray 2 and the turn lever 22.

In addition, although in the above-described implementation example an example of using the turn lever 22 as the tray push-out means is described, the mode of the tray push-out means is not limited thereto. For example, the tray push-out means may have a structure in which the tray push-out means has a slider that moves with the card tray 2; a push-out spring that biases the slider in the push-out direction with a reaction force exerted on the housing 3; and lock means for locking the slider in a position where the card tray 2 is inserted into the tray insertion portion 5, and the lock by the lock means is unlocked by the push operation of the operation member 20.

In addition, the above-described tray type card connector can be used as a low-cost, non-waterproof tray type card connector by not using a water-sealing pin and a cover water-sealing member.

Next, a second embodiment of a tray type card connector according to the present invention will be described based on an implementation example shown in FIGS. 7 to 10A and 10B. Note that a description is made denoting the same components as those of the above-described implementation example by the same reference signs, and reference sign A indicates an electronic device and reference sign B indicates a card.

Figure 7:
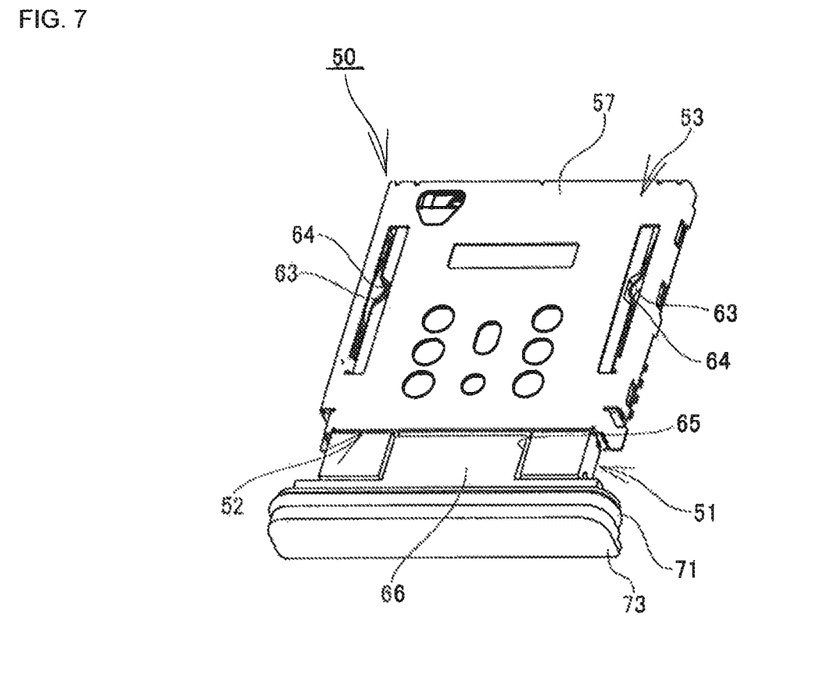
FIG. 7 is a diagram showing another example of a tray type card connector according to the present invention.

This tray type card connector 50 includes a card tray 51 where the card B is held; a housing 53 having a tray insertion portion 52 into which the card tray 51 is inserted; and a plurality of contacts 54, 54 . . . arranged in the housing 53 so as to project within the tray insertion portion 52. By inserting the card tray 51 into the housing 53 through a casing opening portion Aa, pad portions b1, b1 . . . of the card B held in the card tray 51 come into contact with the corresponding contacts 54, 54 . . . , by which the card B is electrically connected to a substrate having the card connector 50 mounted thereon.

In addition, the card connector 50 has an ejection mechanism for ejecting the card tray 51 from the housing 53. By the ejection mechanism, the card tray 51 can be ejected from the housing 53 and a casing of the electronic device A.

The housing 53 is formed in a hollow box form where the tray insertion portion 52 is opened at the front, by assembling a housing main body 56 having a base plate portion 55 made of an insulating synthetic resin and a shield cover 57 made of a conductive metal. The card tray 51 is inserted and removed through the opening at the front.

The housing main body 56 has the flat-shaped base plate portion 55 and sidewall portions 58 and 59 rising from two side edge portions of the base plate portion 55. By the base plate portion 55 and both of the sidewall portions 58 and 59, the tray insertion portion 52 whose top side is recessed is formed. A top surface of the tray insertion portion 52 is covered by a top of the shield cover 57, thereby forming a hollow box form with opening at the front.

The plurality of contacts 54, 54 . . . formed by punching and bending a conductive metal plate material are incorporated into the base plate portion 55 of the housing main body 56 by insert molding. Elastic contact piece portions of the contacts 54, 54 . . . project within the tray insertion portion 52, and contact points at the tips of the elastic contact piece portions come into contact with the corresponding pad portions b1 of the card B.

Figure 8A:
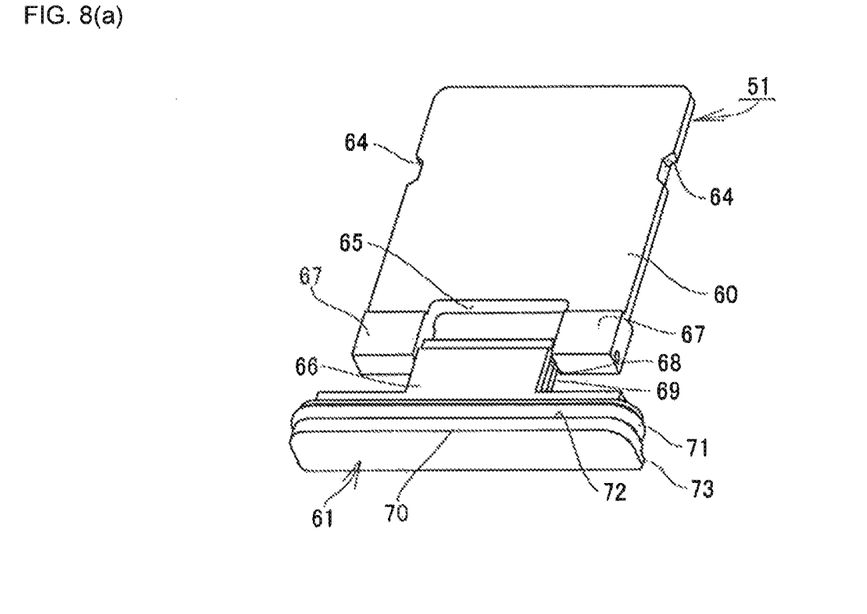
FIG. 8A is a perspective view showing a card tray in FIG. 7.
Figure 8B:
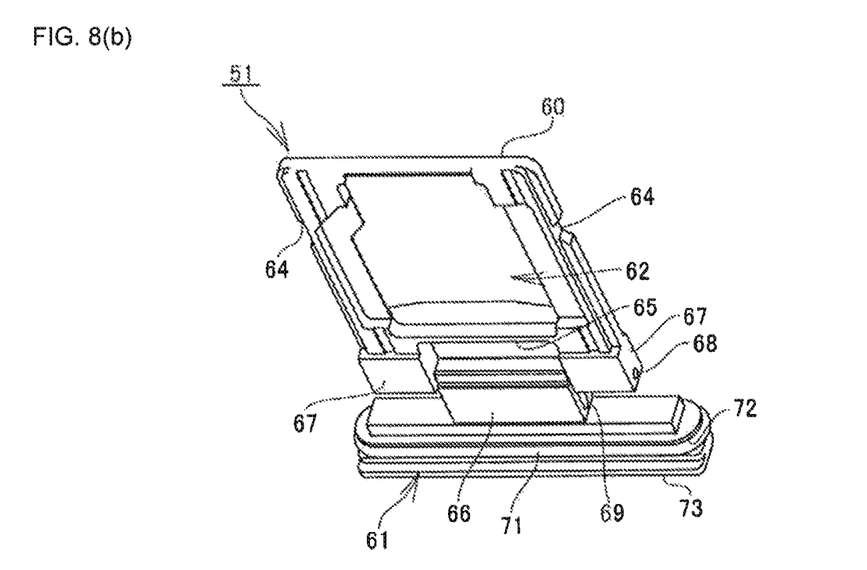
FIG. 8B is a perspective view of the card tray as viewed from the underside.

As shown in FIGS. 8A and 8B, the card tray 51 has a tray main body 60 where the card B is held; and a front cover portion 61 movable relative to the tray main body 60 in a tray insertion and removal direction, at a front end portion of the tray main body 60.

The tray main body 60 is formed in a flat shape using an insulating synthetic resin material. The tray main body 60 has, on its bottom side, a recessed card holding portion 62 in which the card B fits. The tray main body 60 can hold the card B with the signal transmission pad portions b1, b1 . . . exposed at the bottom.

In addition, engagement recess portions 64 and 64 that are engaged with spring-like engagement members 63 and 63 provided to the housing 53 are formed at two side portions of the tray main body 60. By the engagement recess portions 64 and 64 getting engaged with the engagement members 63 and 63, the card tray 51 is retained on the housing 53.

In addition, the tray main body 60 has, at its front end portion, a joint recess portion 65 opened at the front. A joint projection portion 66 provided to the front cover portion 61 is inserted into the joint recess portion 65.

The joint recess portion 65 is formed in a rectangular notch shape which is opened on the front cover portion 61's side and the main body thickness side, at an end portion in a tray pull-out direction of the tray main body 60, by the tray main body 60 having, at its side end portions in the tray pull-out direction, a pair of supporting portions 67 and 67 formed with spacing therebetween in a tray width direction.

Both of the supporting portions 67 and 67 are formed to be thicker than the plate thicknesses of other portions of the tray main body 60. When the card tray 51 is inserted into the housing 53, the side end surfaces in a tray insertion direction of the supporting portions 67 and 67 are stopped by contact with an end surface of the housing 53.

In addition, a rod-like contact-stop member 68 whose both ends are supported by the supporting portions 67 and 67 is provided to the joint recess portion 65 so as to run between inner surfaces of the joint recess portion 65 facing each other. The contact-stop member 68 is inserted into a slide hole 69 made in the joint projection portion 66.

The front cover portion 61 has a cover main body 70 that fits in the casing opening portion Aa; and the joint projection portion 66 that projects from a rear surface of the cover main body 70. A cover water-sealing member 71 is provided at an outer periphery portion of the cover main body 70.

The joint projection portion 66 is formed in a rectangular parallelepiped shape, and has the long hole-shaped slide hole 69 elongated in a slide insertion and removal direction, which is opened at both end surfaces in the tray width direction thereof. By the contact-stop member 68 inserted into the slide hole 69, the front cover portion 61 is movable relative to the tray main body 60.

Figure 9A:
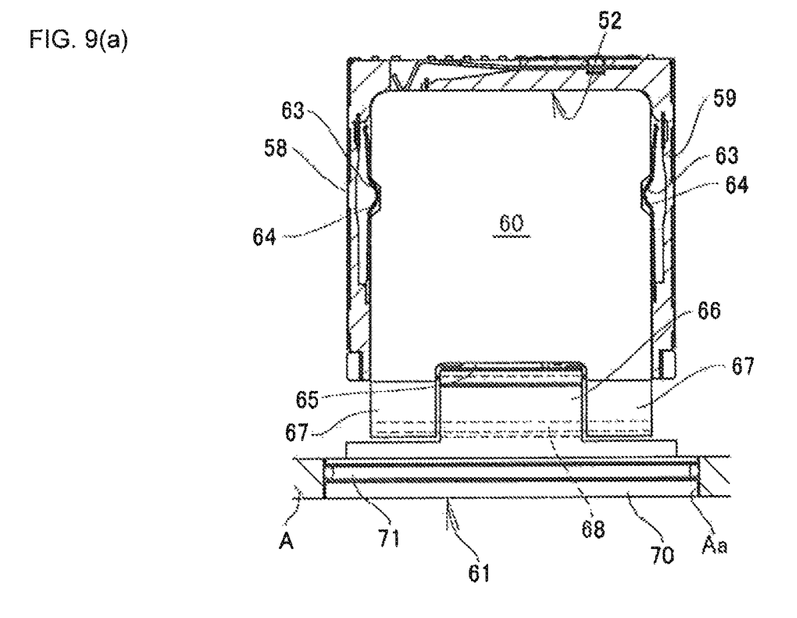
FIG. 9A is a partially cutaway transverse cross-sectional view showing a use state of the tray type card connector in FIGS. 8A and 8B.
Figure 9B:
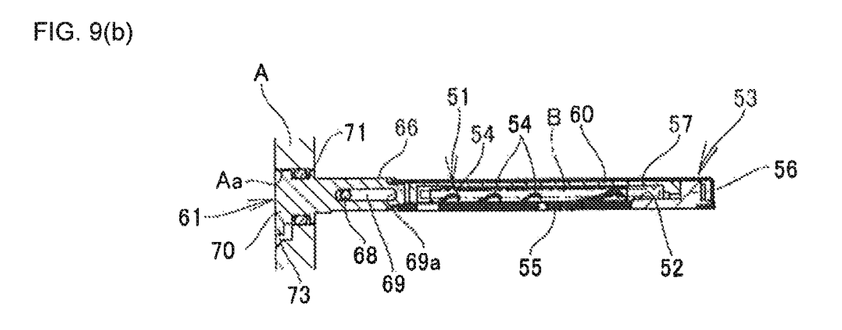
FIG. 9B is a longitudinal cross-sectional view thereof.
Figure 10A:
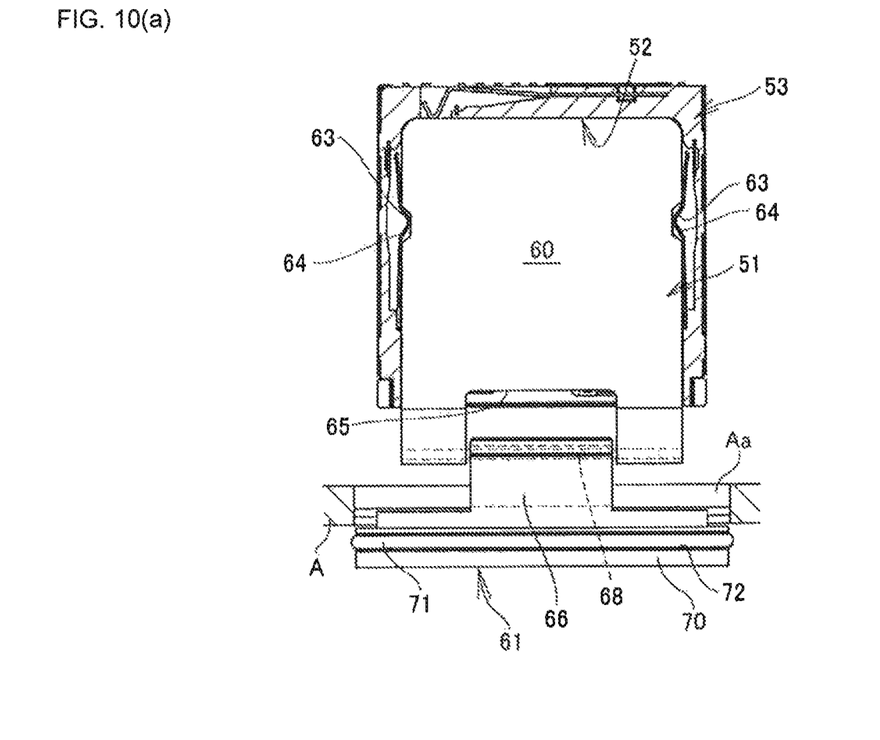
FIG. 10A is a partially cutaway transverse cross-sectional view showing a state of the card connector when the card tray is pulled out.
Figure 10B:
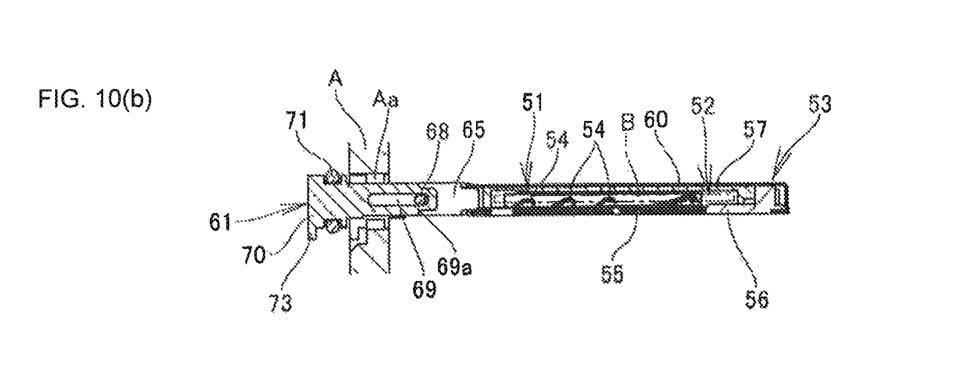
FIG. 10B is a longitudinal cross-sectional view thereof.

Specifically, the front cover portion 61 can slide and move between a normal position shown in FIGS. 9A and 9B, i.e., a position where the joint projection portion 66 is inserted all the way to the back in the tray insertion direction of the joint recess portion 65, and a predetermined pull-out position shown in FIGS. 10A and 10B, i.e., a position where the contact-stop member 68 supported by the tray main body 60 is stopped by contact with an end inner edge 69a in the tray insertion direction of the slide hole 69.

In addition, when the front cover portion 61 is allowed to move to a desired pull-out position relative to the tray main body 60, the end inner edge 69a in the tray insertion direction of the slide hole 69 is stopped by contact with the contact-stop member 68. The contact-stop member 68 and the end inner edge 69a in the tray insertion direction of the slide hole 69 form transmission means. When a force in the tray pull-out direction acts on the front cover portion 61, the end inner edge 69a in the tray insertion direction of the slide hole 69 presses the contact-stop member 68 in the tray pull-out direction. By that, the force in the tray pull-out direction acting on the front cover portion 61 is transmitted to the tray main body 60 through the contact-stop member 68.

The cover main body 70 is formed to match the shape of the casing opening portion Aa. The cover main body 70 has a front view rounded corner rectangular shape and forms a rounded corner rectangular parallelepiped shape having a certain thickness in the tray insertion and removal direction. A groove portion 72 for water-sealing member fixation in a circumferential direction is formed at the outer periphery portion of the cover main body 70. The cover water-sealing member 71 fits in the groove portion 72.

The cover water-sealing member 71 is formed such that its cross section in the circumferential direction is larger than the depth of the groove portion 72. The cover water-sealing member 71 fits in the groove portion 72 so as to project outwardly all around from an outer periphery surface of the cover main body 70. When the cover main body 70 fits in the casing opening portion Aa, the cover water-sealing member 71 is sandwiched between an inner surface of the casing opening portion Aa and the outer periphery surface of the cover main body 70, by which a gap between the inner surface of the casing opening portion Aa and the outer periphery surface of the cover main body 70 is sealed.

In addition, the cover main body 70 has, at its lower edge portion, a hook portion 73 projecting downward, which makes it easier for a human fingernail, etc., to hook on an edge portion of the cover main body 70 when pulling out the front cover portion 61 relative to the tray main body 60.

In the tray type card connector 50 configured in the above-described manner, when, as shown in FIGS. 9A and 9B, the card tray 51 is inserted into the electronic device A through the casing opening portion Aa, the tray main body 60 is inserted into the tray insertion portion 52 of the housing 53 disposed in the electronic device A, and the front cover portion 61 fits in the casing opening portion Aa.

At that time, the joint projection portion 66 fits in the joint recess portion 65, and the front cover portion 61 is in a state of being able to move only in the pull-out direction relative to the tray main body 60.

In this state, since the gap between the inner surface of the casing opening portion Aa and the outer periphery surface of the front cover portion 61 is made watertight by the cover water-sealing member 71, the entry of water into the electronic device A through the casing opening portion Aa is prevented.

In addition, in this state, the engagement recess portions 64 and 64 formed at two side portions of the tray main body 60 are engaged with the spring-like engagement members 63 and 63 provided to the housing 53, by which the tray main body 60 is locked on the housing 53. Thus, the tray main body 60 cannot be pulled out of the housing 53 unless a force of a certain magnitude or more is applied.

Next, to pull out the card tray 51 in the state shown in FIGS. 9A and 9B, first, a fingernail is hooked on the hook portion 73 at the lower edge portion of the cover main body 70. With the fingernail hooked on the hook portion 73, the front cover portion 61 is pulled in the tray pull-out direction.

At that time, the engagement recess portions 64 and 64 are being engaged with the engagement members 63 and 63, and thus, the tray main body 60 is retained on the housing 53 with a high retaining force, and the front cover portion 61 can be pulled out relative to the tray main body 60. Thus, as shown in FIGS. 10A and 10B, only the front cover portion 61 is pulled out of the casing of the electronic device A with a small pull-out force.

Then, the front cover portion 61 is allowed to slide and move while being guided by the contact-stop member 68, and is pulled out to a position where the end inner edge 69a in the tray insertion direction of the slide hole 69 is stopped by contact with the contact-stop member 68. By this, a sufficient finger holding part for holding with two fingers is reserved at the front cover portion 61.

Then, by holding the front cover portion 61 with two fingers, a greater force in the tray pull-out direction can be allowed to act on the front cover portion 61. In addition, by allowing the pull-out force to act on the front cover portion 61, the end inner edge 69a in the tray insertion direction of the slide hole 69 which forms the transmission means presses the contact-stop member 68 in the tray pull-out direction. By that, the force in the tray pull-out direction acting on the front cover portion 61 is transmitted to the tray main body 60 through the contact-stop member 68.

Then, in this state, a pull-out force of a certain magnitude or more, i.e., a force exceeding the retaining force against the housing 53, is allowed to act on the tray main body 60 by holding the front cover portion 61 with two fingers. By this, the engagement members 63 and 63 are elastically deformed and thus the retaining force is released, and the tray main body 60 is pulled out of the tray insertion portion 52. Accordingly, the card tray 51 can be easily pulled out of the housing 53 and the casing of the electronic device A.

Note that the modes of the tray type card connector according to the present invention are not limited to the above-described first and second implementation examples. For example, the tray type card connector may be a push-in/push-out tray type card connector shown in FIGS. 11 to 13A to 13C. Note that the same components as those of the above-described implementation examples are denoted by the same reference signs, and a description thereof is omitted.

Figure 11:
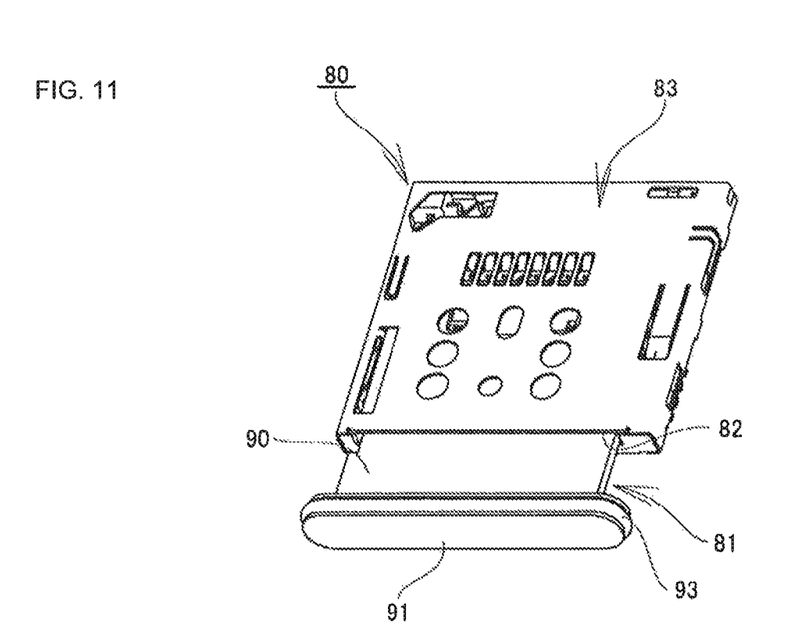
FIG. 11 is a perspective view showing a third implementation example of a tray type card connector according to the present invention.
Figure 12:
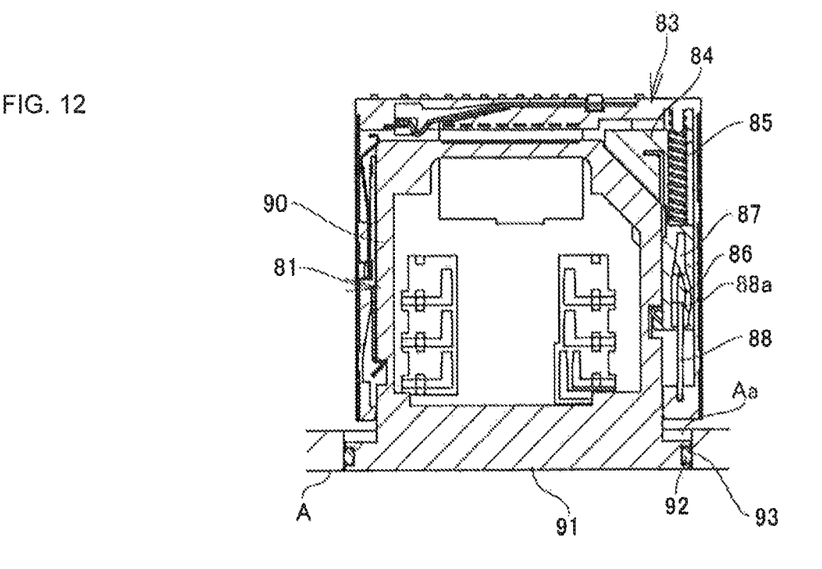
FIG. 12 is a transverse cross-sectional view of the tray type card connector.

This tray type card connector 80 includes a housing 83 having a tray insertion portion 82 into which a card tray 81 is inserted; an ejector 84 that moves with the card tray 81 within the housing 83; a push-out spring 85 that biases the ejector 84 in a push-out direction with a reaction force exerted on the housing 83; a heart cam 86 disposed in the ejector 84 and a loop-shaped pin guide groove 87 provided around the heart cam 86; and a lock pin 88 that has, at its one end, an engagement pin portion 88a slidably inserted into the pin guide groove 87, and that is turnably supported, at its other end, by the housing 83.

In the tray type card connector 80, the engagement pin portion 88a of the lock pin 88 circulatingly moves within the pin guide groove 87 in conjunction with the push operation of the card tray 81. When the card tray 81 is inserted into the housing 83, by push operation performed upon the insertion, the engagement pin portion 88a moves to a position where the engagement pin portion 88a is engaged with the heart cam 86, by which the movement in the tray push-out direction of the ejector 84 is restricted. By another push operation of the card tray 81, the engagement pin portion 88a is disengaged from the heart cam 86, by which the engagement is released. By this, the ejector 84 is pushed by the push-out spring 85, pushing out the card tray 81 in a removal direction.

The card tray 81 has a flat-shaped tray main body 90; and a front cover portion 91 that is disposed at a front end portion of the tray main body 90 in a flanged manner and that fits in a casing opening portion Aa.

The front cover portion 91 is formed to match the shape of the casing opening portion Aa. The front cover portion 91 has a front view rounded corner rectangular shape and forms a rounded corner rectangular parallelepiped shape having a certain thickness in a tray insertion and removal direction. A groove portion 92 for water-sealing member fixation in a circumferential direction is formed at an outer periphery portion of the front cover portion 91. A cover water-sealing member 93 fits in the groove portion 92.

The cover water-sealing member 93 is formed such that its cross section in the circumferential direction is larger than the depth of the groove portion 92. The cover water-sealing member 93 fits in the groove portion 92 so as to project outwardly all around from an outer periphery surface of the front cover portion 91. When the front cover portion 91 fits in the casing opening portion Aa, the cover water-sealing member 93 is sandwiched between an inner surface of the casing opening portion Aa and the outer periphery surface of the front cover portion 91, by which a gap between the inner surface of the casing opening portion Aa and the outer periphery surface of the front cover portion 91 is sealed.

Figure 13A:
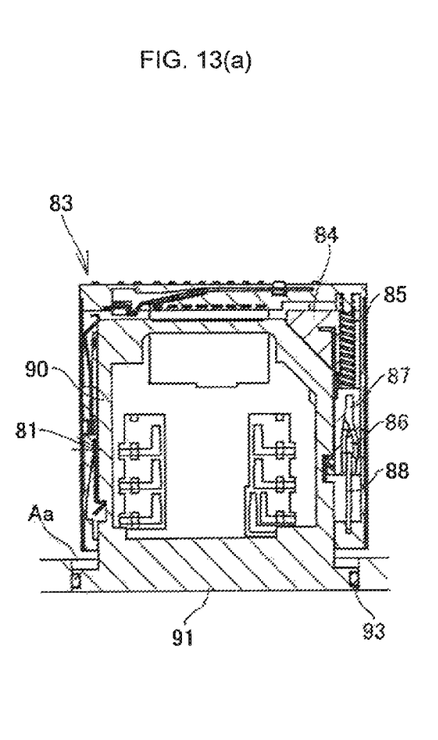
FIGS. 13A to 13C are transverse cross-sectional views showing a procedure for ejecting the tray type card connector.

In the tray type card connector 80 configured in the above-described manner, in a state in which, as shown in FIG. 13A, the card tray 81 is inserted into an electronic device A through the casing opening portion Aa, the tray main body 90 is inserted into the tray insertion portion 82 of the housing 83 disposed in the electronic device A, and the front cover portion 91 fits in the casing opening portion Aa, and the gap between the inner surface of the casing opening portion Aa and the outer periphery surface of the front cover portion 91 is made watertight by the cover water-sealing member 93. Thus, the entry of water into the electronic device A through the casing opening portion Aa is prevented.

Figure 13B:
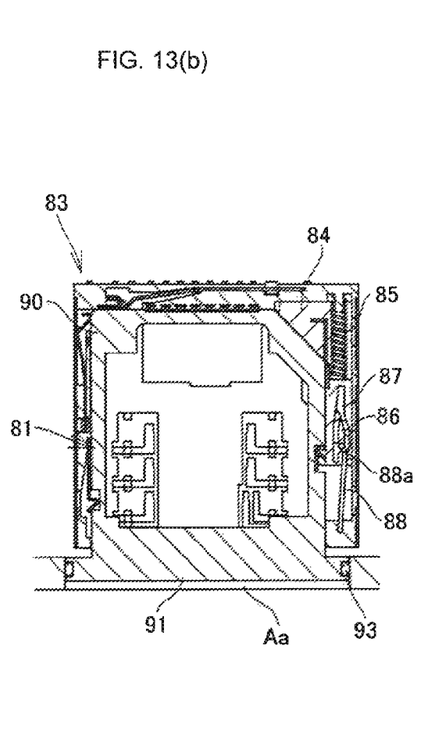
Figure 13C:
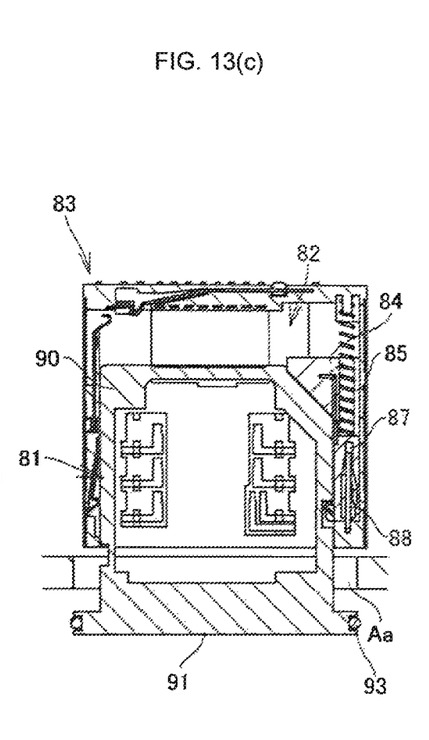

When the front cover portion 91 of the card tray 81 is pushed in the state of FIG. 13A, as shown in FIG. 13B, the front cover portion 91 slides within the casing opening portion Aa with water sealed by the cover water-sealing member 93. Along with it, the entire card tray 81 is pushed and the engagement pin portion 88a of the lock pin 88 comes off the heart cam 86, and accordingly, the lock of the ejector 84 is unlocked. Then, as shown in FIG. 13C, the ejector 84 is pushed by the push-out spring 85, pushing out the card tray 81 in the removal direction.

Note that the mode of the card is not limited to an IC card shown in the above-described implementation examples, and other cards, e.g., a flash memory card, may be used.

REFERENCE SIGNS LIST

A: electronic device
Aa: casing opening portion
B: card
b1: pad portion
1: card connector
2: card tray
3: housing
4: front cover portion
5: tray insertion portion
6: contact
10: housing main body
11: shield cover
12: base plate portion
13 and 14: sidewall portion
15: elastic contact piece portion
15a: contact point
20: operation member
21: operation member retaining portion
22: turn lever
23: to-be-pressed portion
30: tray main body
31: card holding portion
32: engagement member
33: engagement recess portion
34: card supporting portion
35: cover main body
36: coupling portion
37: cover water-sealing member
38: groove portion
39: projection portion
40: pin insertion hole
41: water-sealing pin
42: retaining and sandwiching portion
43: slip-out preventing portion
44: slide sealing portion
45: groove portion
46: pin water-sealing member
47: pin member
50: card connector
51: card tray
52: tray insertion portion
53: housing
54: contact
55: base plate portion
56: housing main body
57: shield cover
58 and 59: sidewall portion
60: tray main body
61: front cover portion
62: card holding portion
63: engagement member
64: engagement recess portion
65: joint recess portion
66: joint projection portion
67: supporting portion
68: contact-stop member
69: slide hole
70: cover main body
71: cover water-sealing member
72: groove portion
73: hook portion
80: tray type card connector
81: card tray
82: tray insertion portion
83: housing
84: ejector
85: push-out spring
86: heart cam
87: pin guide groove
88: lock pin
90: tray main body
91: front cover portion
92: groove portion
93: cover water-sealing member

What is claimed is:

1. A tray type card connector including: a card tray that holds a card; a housing having a tray insertion portion into which the card tray is inserted; and a plurality of contacts arranged in the housing so as to project within the tray insertion portion, in which pad portions formed on the card held in the card tray come into contact with the contacts by inserting the card tray into the tray insertion portion, the tray type card connector comprising:
  a front cover portion at a front end portion of the card tray, the front cover portion fitting in a casing opening portion opened at a lateral surface portion of a casing of an electronic device; and
  a ring-shaped cover water-sealing member at an outer periphery portion of the front cover portion, the cover water-sealing member being made of an elastic material, wherein
  when the front cover portion fits in the casing opening portion, a gap between an inner surface of the casing opening portion and an outer surface of the front cover portion is sealed by the cover water-sealing member.

2. The tray type card connector according to claim 1, further comprising:
  an operation member disposed at a side portion of the housing so as to be movable in a tray insertion and removal direction;
  tray push-out means for pushing out the card tray in a removal direction in conjunction with push operation of the operation member;
  a pin insertion hole made in the front cover portion so as to be disposed continuously with the operation member; and
  a water-sealing pin movably held in the pin insertion hole, wherein
  the operation member performs push operation in conjunction with movement of the water-sealing pin,
  the tray type card connector further comprises a ring-shaped pin water-sealing member at an outer periphery portion of the water-sealing pin, the pin water-sealing member being made of an elastic material, and a gap between an inner surface of the pin insertion hole and an outer surface of the water-sealing pin is sealed by the pin water-sealing member.

3. The tray type card connector according to claim 2, wherein the water-sealing pin has a slip-out preventing portion that juts out outwardly to get engaged with a rear end opening edge portion of the pin insertion hole, and the water-sealing pin is held in the pin insertion hole so as to be movable and to be incapable of slipping out.

4. The tray type card connector according to claim 2, wherein the water-sealing pin is integrally formed with the operation member.

5. The tray type card connector according to claim 1, wherein the card tray has the front cover portion at a front end portion of a tray main body where the card is held, such that the front cover portion is movable relative to the tray main body, and has transmission means for transmitting a force in a tray pull-out direction to the tray main body, the force acting on the front cover portion being moved to a desired pull-out position relative to the tray main body, and the front cover portion is allowed to move relative to the tray main body to pull out the card tray using the front cover portion as a finger holding part.

6. The tray type card connector according to claim 1, further comprising:

an ejector that moves with the card tray;

a push-out spring that biases the ejector in a push-out direction;

a heart cam disposed in one of the housing and the ejector;

a loop-shaped pin guide groove provided around the heart cam; and a lock pin that has, at its one end, an engagement pin portion slidably inserted into the pin guide groove, and that is turnably supported, at its other end, by an other one of the housing and the ejector, wherein by initial card tray push operation, the engagement pin portion moves to a position where the engagement pin portion is engaged with the heart cam, by which movement in a tray push-out direction of the ejector is restricted, and by another card tray push operation, the engagement pin portion is disengaged from the heart cam, by which the engagement is released.

7. The tray type card connector according to claim 3, wherein the water-sealing pin is integrally formed with the operation member.

\* \* \* \* \*